Sept. 30, 1958 W. C. SMITH 2,854,250
LOCKING MECHANISM FOR SLIDING FIFTH WHEEL OF TRUCKS
Filed March 22, 1957
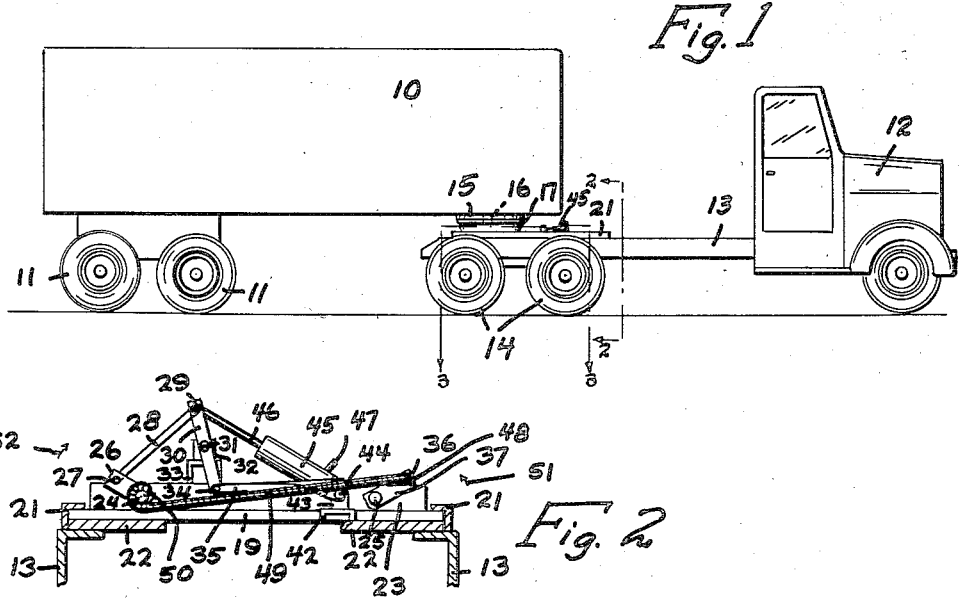
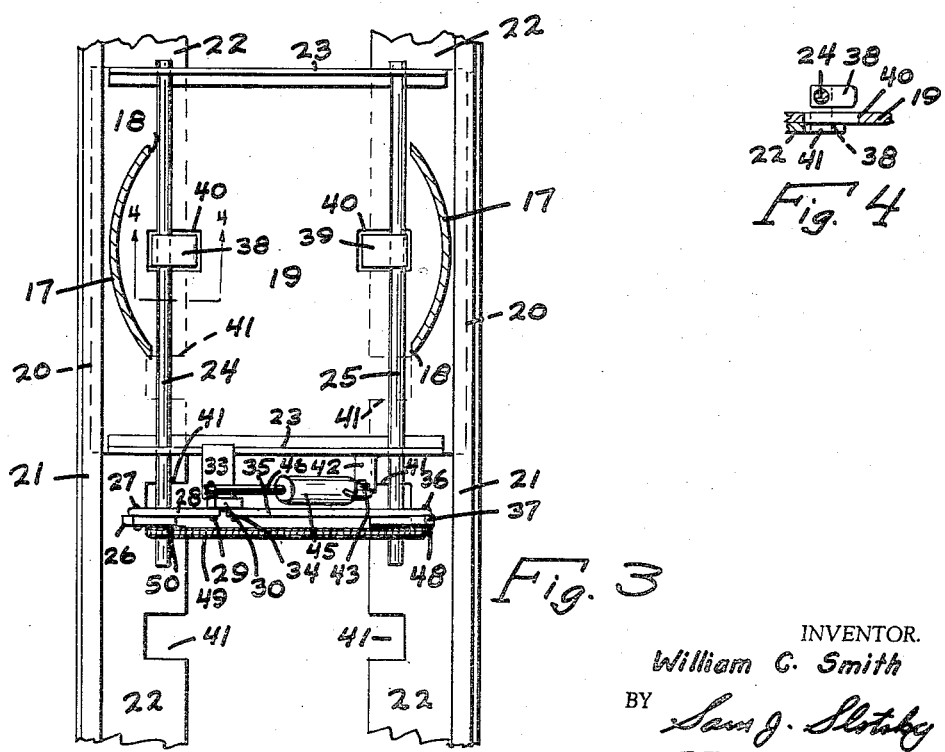
INVENTOR.
William C. Smith
BY
Sam J. Slotsky
ATTORNEY United States Patent Office 2,854,250
Patented Sept. 30, 1958

2,854,250

LOCKING MECHANISM FOR SLIDING FIFTH WHEEL OF TRUCKS

William C. Smith, Edgerton, Minn.

Application March 22, 1957, Serial No. 647,820

2 Claims. (Cl. 280—407)

My invention relates to adjustable and slidable fifth wheels of trucks.

An object of my invention is to provide a slidable fifth wheel together with readily operated locking means wherein the fifth wheel can be adjustably positioned so as to change the load on the forward cab framework.

A further object of my invention is to provide a pneumatic arrangement for operating the locking device so that after the cab is moved to the adjusted position the arrangement is readily locked.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of a semi-trailer and forward drawing cab arrangement using my invention, Figure 2 is an enlarged view taken along the section lines 2—2 of Figure 1, Figure 3 is an enlarged plan view taken generally along the lines 3—3 of Figure 2, and Figure 4 is a sectional detail taken along the lines 4—4 of Figure 3.

My invention contemplates a readily adjustable arrangement for fifth wheels of trucks together with attendant locking means which readily and easily lock the fifth wheel in selected position.

I have used the character 10 to designate the rear semi-trailer truck, the character 11 indicating the rear wheels thereof, and I have used the character 12 to indicate generally the forward cab adapted to draw the semi-trailer 10. Attached to the cab are the framework portions 13 which extend rearwardly therefrom and are usually channel-shaped, the character 14 indicating the intermediate wheels which are suitably attached to the framework 13.

The character 15 indicates the upper disc of the fifth wheel, the "fifth wheel" referring to the portion which allows pivotal movement of the semi-trailer, the character 16 indicating the usual pin, and the character 17 indicating the lower portion of the fifth wheel, the portion 15 thereby sliding in pivotal movement about the portion 17.

The portion 17 is suitably cut away as at 18, this portion 17 in my invention being rigidly secured to a flat plate 19, the side edges 20 of which are slidably received within the longitudinally extending angle members 21 which are secured to the further longitudinally extending plates 22, which plates are attached to the framework members 13.

Secured to the forward and rear edges of the plate 19 are a pair of further angle members 23 in which are journalled the spaced round rods 24 and 25, and attached to the rod 24 is an arm 26 to which is pivoted at 27 a link 28 which is pivotally attached at 29 to a bar 30, which is pivotally attached at 31 to a post 32, which is secured to a channel-shaped member 33, which is secured to the forward angle 23.

Pivoted to the bar 30 at 34 is a further link 35 which is pivotally secured at 36 to a further arm 37 which is secured to the rod 25.

Attached to the rods 24 and 25 are the lugs 38 and 39 which normally extend inwardly as shown, and cut out of the plate 19 are the openings 40 in which the lugs 38 and 39 operate.

The plates 22 include the substantially square cut out notches 41, which notches are spaced longitudinally along the members 22 to any desired spacing consistent with the adjustable desired positions of the forward end of the trailer with respect to the cab framework.

Secured to the forward edge of the plate 19 is a further channel member 42 having the post 43 attached thereto, to which post is pivotally attached at 44 the air cylinder 45 having a suitable piston therein attached to the piston rod 46 which is pivoted to the bar 30 at the point 29, the character 47 indicating an air hose connection at the bottom of the cylinder 45, which air hose runs to a suitable air pressure source in the cab.

Secured at 48 to the arm 37 is a coiled helical spring 49 which is wrapped around the rod 24 and is firmly secured thereto at 50.

The arrangement operates in the following manner. When it is desired to adjust the load on the framework 13 for the desired purpose of adjusting the load consistent with the load in the trailer, etc. the lugs 38 and 39 will be in the unlocked position as shown by the solid lines in Figures 3 and 4, and in this position the air pressure will be applied into the cylinder 45, the lugs 38 and 39 being practically horizontal as shown in Figure 4.

The cab 12 is then driven forwardly or backed up until the lugs 38 and 39 will register with any desired pair of opposed notches 41, and then the compressed air is released from the cylinders 45, whereupon the spring 49 will pull on the arm 37 and will rotate this arm in the direction of the arrow 51 (see Figure 2) which will correspondingly pivot the bar 30 at the same time rotating the arm 26 in the direction of the arrow 52, and simultaneously rotating the lugs 38 and 39 into these opposed notches 41 and as shown by the dotted lines in Figure 4. The arrangement is then in the locked position, and the cab can pull the trailer in a positively locked condition since the air pressure will be off. If desired, the air pressure can be released and the spring action started with the lugs being slightly off with respect to the receiving notches 41, a slight movement of the cab causing the lugs to then snap into these notches.

As a result the desired adjustment is readily made from the cab without requiring the necessity of using cumbersome extra pins and other devices which would be required in purely mechanical arrangements.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A locking mechanism for sliding fifth wheel of trucks comprising a slidable plate attached to the lower portion of said fifth wheel, channels receiving the edges of said slidable plate, said channels being attached to the framework of a cab pulling the semi-trailer to which said fifth wheel is attached, said framework including longitudinally positioned plates attached thereto having a plurality of horizontally spaced notches, a pair of laterally spaced rods journalled on said slidable plate, lugs attached to said rods adapted to register with any of said selected notches, said slidable plate having openings in which said lugs travel, supports in which said rods are journalled, means for rotating said rods including arms attached to said rods, air pressure means for swinging said arms, said air pressure means including a compressed air cylinder pivoted to said slidable plate, a bar pivotally secured to said slidable plate substantially medially of said bar, links attached to the ends of said bar and to the ends of said arms.

2. A locking mechanism for sliding fifth wheel of trucks comprising a slidable plate attached to the lower portion of said fifth wheel, channels receiving the edges of said slidable plate, said channels being attached to the framework of a cab pulling the semi-trailer to which said fifth wheel is attached, said framework including longitudinally positioned plates attached thereto having a plurality of horizontally spaced notches, a pair of laterally spaced rods journalled on said slidable plate, lugs attached to said rods adapted to register with any of said selected notches, said slidable plate having openings in which said lugs travel, supports in which said rods are journalled, means for rotating said rods including arms attached to said rods, air pressure means for swinging said arms, said air pressure means including a compressed air cylinder pivoted to said slidable plate, a bar pivotally secured to said slidable plate substantially medially of said bar, links attached to the ends of said bar and to the ends of said arms, a spring attached to one of said arms whereby both of said arms will be swung upon release of air from said cylinder to correspondingly lock said lugs in any of said opposed selected notches.

References Cited in the file of this patent

UNITED STATES PATENTS

| | | |
|---|---|---|
| 2,317,508 | Zoder | Apr. 27, 1943 |
| 2,750,207 | Greenway | June 12, 1956 |
| 2,755,104 | Braunberger | July 17, 1956 |